United States Patent
Kim et al.

(10) Patent No.: US 8,508,916 B2
(45) Date of Patent: Aug. 13, 2013

(54) HIGH VOLTAGE ELECTRIC DOUBLE LAYER CAPACITOR DEVICE AND METHODS OF MANUFACTURE

(75) Inventors: Kyle Yun-Su Kim, Manteca, CA (US); Hundi Panduranga Kamath, Los Altos, CA (US)

(73) Assignee: Cooper Technologies Company, Houston, TX (US)

( * ) Notice: Subject to any disclaimer, the term of this patent is extended or adjusted under 35 U.S.C. 154(b) by 252 days.

(21) Appl. No.: 12/903,574

(22) Filed: Oct. 13, 2010

(65) Prior Publication Data

US 2012/0092808 A1   Apr. 19, 2012

(51) Int. Cl.
*H01G 9/00* (2006.01)
*H01G 5/38* (2006.01)

(52) U.S. Cl.
USPC .......................................... 361/502; 361/541

(58) Field of Classification Search
None
See application file for complete search history.

(56) References Cited

U.S. PATENT DOCUMENTS

| | | | |
|---|---|---|---|
| 4,562,511 A | 12/1985 | Nishino et al. | |
| 4,709,303 A * | 11/1987 | Fujiwara et al. | 361/502 |
| 4,737,889 A * | 4/1988 | Nishino et al. | 361/502 |
| 5,227,960 A | 7/1993 | Kunishi et al. | |
| 5,952,121 A | 9/1999 | Blonsky et al. | |
| 6,392,868 B2 | 5/2002 | Ohya et al. | |
| 6,493,209 B1 | 12/2002 | Kamath et al. | |
| 6,574,092 B2 * | 6/2003 | Sato et al. | 361/502 |
| 6,579,327 B1 | 6/2003 | Shiue et al. | |
| 2009/0168305 A1 | 7/2009 | Fleig et al. | |

FOREIGN PATENT DOCUMENTS

| | | |
|---|---|---|
| EP | 1331677 A2 | 7/2003 |
| WO | 2007091309 A1 | 8/2007 |
| WO | 2010028433 A1 | 3/2010 |

OTHER PUBLICATIONS

International Search Report and Written Opinion for PCT/US2011/053385; Apr. 4, 2012; 10 pages.

* cited by examiner

*Primary Examiner* — Jayprakash N Gandhi
*Assistant Examiner* — Dion Ferguson
(74) *Attorney, Agent, or Firm* — Armstrong Teasdale LLP (57) ABSTRACT

Electric double layer capacitor (EDLC) devices include sealing conductor establishing a series connection between multiple storage cells in a single package, which may be operable at higher voltages than conventional EDLC devices.

25 Claims, 3 Drawing Sheets

HIGH VOLTAGE ELECTRIC DOUBLE LAYER CAPACITOR DEVICE AND METHODS OF MANUFACTURE

BACKGROUND OF THE INVENTION

The field of the invention relates generally to electrochemical energy storage devices and methods of manufacture, and more specifically to electric double layer capacitor (EDLC) devices and methods of manufacturing such devices.

In electrical systems, secondary sources of current make it possible to accumulate, store and release electrical power to an external electric circuit. Among these secondary sources are conventional batteries, conventional capacitors and electrochemical capacitors.

One type of electrochemical capacitor is an electric double layer capacitor (EDLC) device that may sometimes be referred to as a supercapacitor. Supercapacitors typically have specific capacitance of greater than 100 F/g, as opposed to conventional capacitors with specific capacitance on the order of only several F/g. Supercapacitors are used in a variety of different applications, including but not limited to memory backup to bridge short power interruptions, battery management applications to improve the current handling of a battery or to provide a current boost on high load demands, fuel cell applications to enhance peak-load performance, regenerative braking on vehicles, and vehicle starting systems.

An electrochemical supercapacitor conventionally includes a sealed housing filled with an electrolyte, a positive electrode (cathode) and a negative electrode (anode) placed inside the housing, a separator such as a membrane that separates the anode space from the cathode space, and special lead terminals coupling the supercapacitor to external electric circuits. Manufacturing difficulties and voltage limitations exist in known supercapacitor constructions, and improvements are desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION OF THE INVENTION

EDLC devices are known and in used as secondary sources of current in a variety of applications. There are practical limitations, however, on the operating voltages of the EDLC devices in use, and as result existing EDLC devices, tend to operate at rather low voltages of perhaps several volts or less. In one example, a known EDLC device is operable at voltages of about 2.5 to about 2.7V but not more. Conventionally, and because of practical challenges in increasing operating voltage of a relatively small EDLC device, two or more EDLC devices are commonly used in combination and electrically connected in series when the end use demands higher operating voltage than the EDLC devices could individually handle.

The use of multiple, lower voltage EDLC devices in combination is not a completely satisfactory solution in the art, however. Generally speaking, as the number of EDLC devices increases, additional cost and complexity is introduced to energy storage circuitry which directly increases costs of the systems in which the EDLC devices are used. Balancing elements and the like may be required to maintain an equal operating voltage across the EDLC devices, further increasing the complexity of the circuitry and leading to still further expense. Maintenance and reliability issues may also be more pronounced as the number of EDLC devices increases for any given installation.

Electric double layer capacitors (EDLC) devices are sometimes provided in a coin or button cell configuration. Such coin cell EDLC devices are desirable because they tend to have a higher energy density in a relatively compact construction compared to other known EDLC configurations, and a much higher power density than batteries. They are subject, however, to the same operating voltage limitations mentioned above, and improvements are desired.

Exemplary embodiments of electric double layer capacitor (EDLC) devices are described hereinbelow that overcome these and other disadvantages in the art. Embodiments of EDLC devices configured as coil cells, as well as other package configurations are provided, that are capable of operating at higher voltages than conventional EDLC devices. This, in turn, tends to decrease the number of EDLC devices required for any given installation, leading to space savings and simplified energy circuitry. Lower cost, yet highly reliable, energy storage systems are therefore possible.

This is accomplished, as described below, by providing multiple storage cells in a single EDLC device. By providing more than one energy storage cell in the EDLC device, its operating voltage is accordingly increased, but in a smaller package size than two single EDLC devices each having single cells as in conventional EDLC devices. Method aspects of manufacturing such EDLC devices will be in part apparent and in part specifically discussed below.

Figure 1:
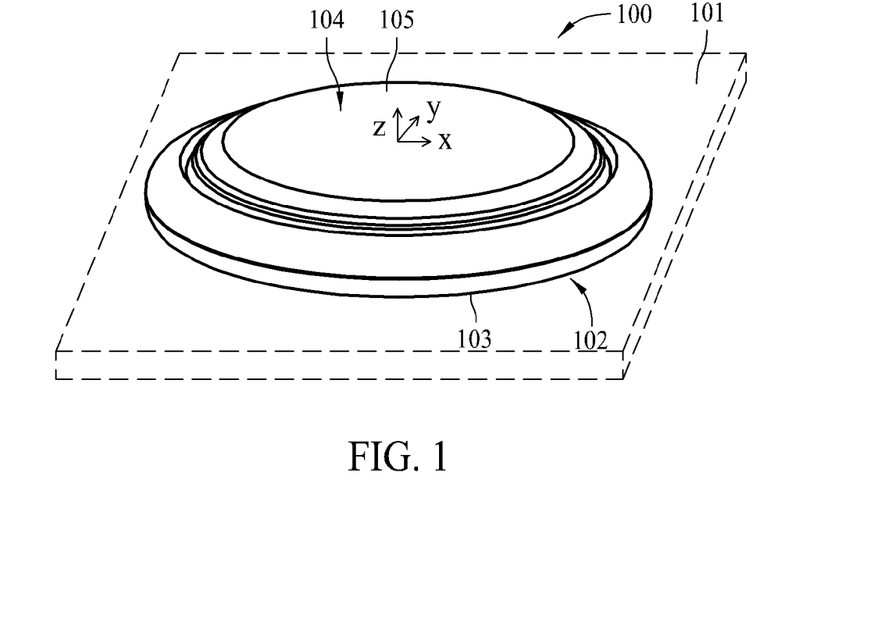
FIG. 1 is a perspective view of a first exemplary electric double layer capacitor (EDLC) device.

FIG. 1 is a perspective view of an exemplary electric double layer capacitor (EDLC) device 100 formed in accordance with an exemplary embodiment of the invention. The EDLC device 100 generally includes a housing assembled from a first conductive housing piece 102 and a second conductive housing piece 104 that, in the example shown in FIG. 1, collectively defines a coin cell package configuration as those in the art would recognize due to its resemblance in overall shape to a currency coin, such as a dime, for example. That is, the device 100 is provided in a disc-shaped or coin-shaped package.

One of the benefits of a coin cell configuration is its low profile. That is, the device 100, by virtue of the housings pieces 102 and 104 has a relatively small thickness yet a relatively wide surface area on the opposing sides of the device 100. More specifically, and as used herein, a "low-profile" device has a first dimension that is substantially smaller than a second and third dimension in an orthogonal coordinate system. That is, considering a Cartesian coordinate system having axes x, y, and z as shown in FIG. 1, the x axis may correspond to a length dimension of the device 100, the y axis may correspond to a width dimension of the device 100, and the z dimension may correspond to the height or thickness dimension of the device 100. In the exemplary device shown, the thickness dimension z is much less than either the length or width dimensions x or y.

The thickness dimension z is typically rather small and is measured in millimeters. As one non-limiting example, the ELDC device 100 may have an overall diameter, measured in the x, y, plane on the order of about 25 mm and a thickness dimension on the order of about 5 mm or less. Various other dimensions, both greater and smaller, are possible. Various dimensions may be provided to produce package sizes comparable to conventional coin cell batteries, applicable standards, or to meet user defined specifications. Advantageously, the small thickness dimension z provides a low-profile height that facilitates installation of the device 100 in a slim electronic device, for example.

Each housing piece 102 and 104 defines a respective and generally circular contact area 103, 105 for connection to corresponding electrical terminals of circuitry. The circuitry may be established on a circuit board 101 (shown in phantom in FIG. 1) in an exemplary embodiment. The contact areas 103, 105 of the device 100 are spaced apart and extend opposite one another in the device 100, and the area 103, for example, may lie in surface engagement with a first terminal pad formed on a surface of a circuit board 101. A power terminal, provided on and extending from the board 101 contacts the area 105, or perhaps the periphery of the housing 104 surrounding the contact area 105, to complete the circuit through the EDLC device 100. The low profile of the EDLC device 100, measured in the z dimension extending perpendicular to the major surfaces of the board 101, facilitates a slim electronic device including the board 101. The board 101 may be configured to accommodate a single EDLC device 100 or multiple devices 100 depending on end use requirements.

In the exemplary EDLC device 100, the diameter of the contact area 103, 105 (also shown in FIG. 2) corresponding to each housing piece 102 and 104 is different. More specifically, the contact area 103 of the housing piece 102 has a larger diameter than the contact area 105 of the housing piece 104. The contact area 105 is further inset in the device 100 or spaced from the outer periphery of the overall device in the x, y plane. These features of the contact areas 103, 105 may be coordinated with the connecting terminals of the circuit board 101 to ensure that the device 100 is installed with the proper polarity in use. In other words, the connecting terminals may be configured to accept the EDLC device 100 in only one orientation. Alternatively stated, the dimensions of the housing pieces 102, 104 and the connecting terminals may be selected so that the EDLC device 100 can only be installed right-side up and any attempt to install the device 100 upside down will be frustrated. Undesirable reverse current flow through the device 100 due to improper installation is therefore avoided.

In use, one of the housing pieces 102 and 104 may be connected to a positive, line-side terminal of the board 101 and the other of the housing pieces 102 and 104 may be connected to a negative, load-side terminal of the board 101, with the device 100 completing an electrical connection between the positive and negative terminals. As current flows from the positive terminal to the negative terminal through the ELDC device 100 when so connected, energy is stored in the device 100 and accordingly may be discharged from the device 100 when needed.

The housing pieces 102, 104 may each be formed from electrically conductive metals or metal alloys in exemplary embodiments using known techniques.

Unlike conventional coin cell EDLC devices, the EDLC device 100 includes multiple storage cells that are electrically connected in series internal to the housing of the device 100. The series connected storage cells in the device 100 allows the EDLC device 100 to operate at higher voltages than is otherwise possible with a single cell device. As such, the EDLC device 100 is operable with higher voltage drops between the polarized housing pieces 102 and 104 than has been conventionally possible.

The higher operating voltage capabilities of the EDLC device 100 further allows for a reduction in the number of EDLC devices required for certain installations, leading to space savings and simplified energy storage circuitry. The EDLC device 100 may be used in place of two single cell EDLC devices with a much smaller package size than two single cell devices each contained in separate housings, but used in combination. The size of the circuit board 101 may accordingly be reduced to provide even smaller electronic devices. Costs of providing energy storage systems may accordingly be reduced, and reliability of the energy storage system may be increased. More powerful, yet smaller and lower cost energy storage systems, are therefore possible.

Figure 2:
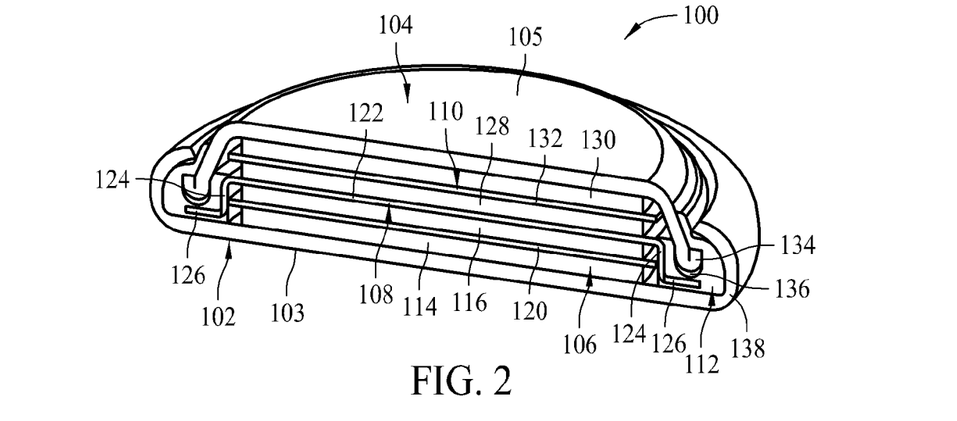
FIG. 2 is a sectional view of the EDLC device shown in FIG. 1.

Turning now to FIG. 2, the internal construction of the exemplary EDLC device 100 is shown in sectional view. The device 100 includes, as shown in FIG. 2, a first storage cell 106, a sealing conductor 108, a second storage cell 110 and a sealing insulator 112. The storage cells 106 and 110, the sealing conductor 108, and the sealing insulator 112 are generally enclosed by the conductive housing pieces 102, 104. The housing pieces 102 and 104 collectively define an interior cavity that accommodates the cells 106 and 110, the sealing conductor 108 and the insulator 112.

The first storage cell 106 is positioned adjacent to and in contact with the housing piece 102 opposite the contact area 103. The first storage cell 106 includes electrodes 114 and 116 extending on opposing sides of a separator 120. In use, one of the electrodes 114 and 116 serves as an anode and the other of the electrodes 114 and 116 serves as a cathode, depending on the polarity of the device 100 when connected to electrical circuitry. The construction and operation of the cell 106 in the EDLC device 100 is well understood and will not be detailed further herein.

The sealing conductor 108 in the exemplary embodiment shown includes a generally flat end wall 122, a generally cylindrical side wall 124 extending from the end wall 122, and a sealing rim or flange 126 extending outwardly from the side wall 124. The end wall 122 overlies and is in contact with electrode 116 of the first storage cell 106 and has a diameter that is larger than the storage cell 106, such that the cylindrical side wall 124 generally surrounds the periphery or circumference of the first cell 106. That is the end walls 122 and the side wall 124 generally define an enclosure extending above the housing 102 that contains the first cell 106. The sealing rim 126 extends parallel to, but in a plane spaced from the end wall 122. That is, the side wall 124 interconnects the end wall 122 and the sealing rim 126 with the wall 122 and the rim 126 extending from opposing ends of the side wall 124. The sealing rim 126 is annular and has an outer diameter larger than the end wall 122 and the side wall 124. The sealing conductor 108 may be formed from a conductive material known in the art according to known techniques.

The second storage cell 110 extends adjacent to and in contact with the end wall 122 of the sealing conductor 108. The second storage cell 110 includes electrodes 128 and 130 extending on opposing sides of a separator 132. In use, one of the electrodes 128 and 130 serves as an anode and the other of the electrodes 128 and 130 serves as a cathode, depending on the polarity of the device 100 as connected to electrical circuitry. The construction and operation of the cell 110 in the EDLC device 100 is well understood and will not be detailed further herein. In an exemplary embodiment, the cell 110 is constructed substantially identically to the cell 106, although it is contemplated that the cells 106 and 110 could be constructed differently if desired. That is, the cells 106 and 110 may or may not include the same types of electrodes or separators in various embodiments of the device 100.

The end wall 122 of the sealing conductor 108 electrically connects the storage cells 106 and 110 in series with one another, while isolating ion movement between the cells 106 and 110 in operation. That is, the sealing conductor 108 separates the storage cells 106, 110 such that ions are prevented from moving from one cell 106 to the other 110 or vice-versa, but the sealing conductor 108 nonetheless provides a conductive path between the cells 106 and 110. As such, and as one example, current may flow from the housing piece 102 to and through the first storage cell 106, from the first storage cell 106 to and through the sealing conductor 108, from the sealing conductor 108 to and through the second storage cell 110, and from the second storage cell 110 to and through the housing piece 104. Via the storage cells 106 and 110, energy is stored in the device 100 and can be discharged when the voltage potential across the housing pieces 102 and 104 drops below a predetermined threshold. As such, the EDLC device 100 both stores and dissipates energy in response to actual operating conditions in a circuit. The sealing conductor 108 may be fabricated utilizing known techniques and suitable conductive materials in the art, including but not necessarily limited to metallic materials, conductive polymers, and conductive composite materials.

The sealing insulator 112 is coupled to a portion of the sealing conductor 108. In the illustrated embodiment, the sealing insulator 112 is in contact with and generally surrounds the side wall 124 of the sealing conductor 108. Additionally, the sealing insulator 112 is formed with an annular slot that receives and is engaged with the sealing rim 126 of the sealing conductor 108.

As also shown in FIG. 2 the sealing insulator 112 is configured to mechanically interconnect the first and second housing pieces 102 and 104. An outer periphery 134 of the housing 104 extends to and is received in an interior area or cavity 136 of the sealing insulator 112, while an outer periphery 138 of the housing 102 wraps around the exterior of the sealing insulator 112. The sealing insulator 112 therefore extends between and electrically isolates the housing piece 102 from the housing piece 104 on the interior as well as the exterior of the device 100. The sealing insulator 112 as shown further mechanically interconnects, but electrically isolates, the sealing conductor 108 from both of the housing pieces 102 and 104. That is, a portion of the sealing insulator 112 extends between the housing 102 and the sealing rim 126 of the sealing conductor 108, another portion of the sealing insulator 112 extends between the sealing rim 126 and the outer periphery of the housing piece 104, and still another portions of the sealing conductor 112 extends between the cylindrical side wall 124 of the sealing conductor 108 and the outer periphery of the housing piece 104. The sealing insulator 112 may be fabricated utilizing known techniques and suitable materials in the art, including but not necessarily limited to nonconductive metal oxide and nonconductive polymer materials.

Figure 3:
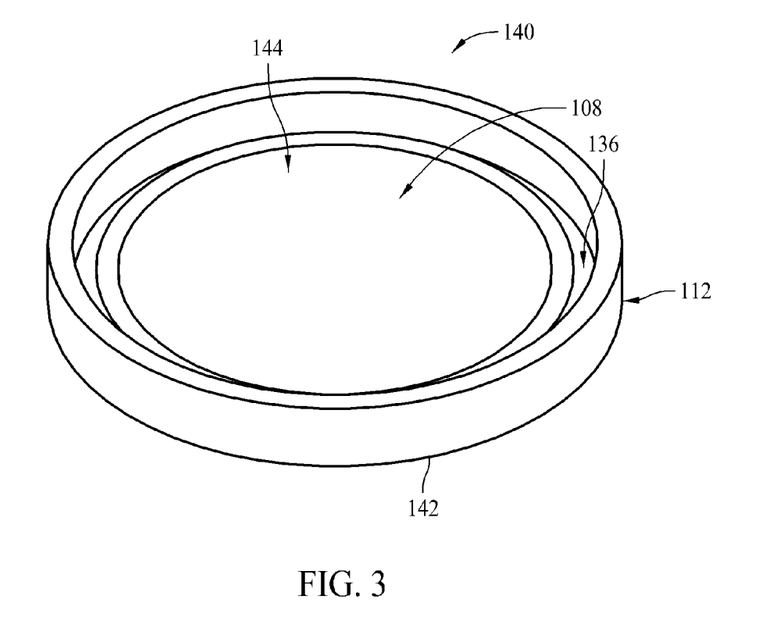
FIG. 3 is a perspective view of a portion of the EDLC device shown in FIGS. 1 and 2.

FIG. 3 is a perspective view of the sealing conductor 108 and the sealing insulator 112, which may be provided as a subassembly 140 in the manufacture of the EDLC device 100 (FIGS. 1 and 2). After the sealing conductor 108 is formed, the insulator 112 may be press fit to the conductor 108.

The storage cell 106 (FIG. 2) may be formed on one side 142 of the assembly 140 with the electrode 116 (FIG. 2) contacting the sealing conductor 108 on the corresponding side 142. The housing piece 102 may then be fitted over the insulator 112 to complete one half of the EDLC device 100.

The other storage cell 110 (FIG. 2) may be formed on the side 144 of the assembly 140 with the electrode 128 (FIG. 2) in contact with the sealing conductor 108. The housing piece 104 may be fitted with the insulator 112 to complete the EDLC device 100.

The device 100 may be assembled in an order other than that described as those in the art would no doubt realize.

While exemplary embodiment of the ELDC device 100 have been illustrated and described, it is contemplated that various modifications are possible while achieving comparable function, effects, and advantageous results of the EDLC device 100 to varying extents.

For example, the sealing rim 126 of the sealing conductor 108 may in some embodiments be considered optional and may be omitted. Likewise, the side wall 124 of the conductor 108 could perhaps be eliminated in some embodiments. It is also possible that the conductor 108 could be effectively reversed when installed, such that the side wall 124 could surround the storage cell 110 instead of the cell 106 as shown. Instead of surrounding one or other of the cells 106 and 110, the side wall 124 could perhaps surround both of the cells 106 and 110. It is understood that modifications to the sealing conductor 108 may require appropriate modification of the sealing insulator 112, and vice versa.

It is also contemplated that more than one insulator may be utilized in combination to provide the various electrical isolation and sealing features described. That is, while the sealing insulator 112 described is beneficially a single piece simultaneously serving the multiple sealing and electrical isolation purposes discussed above, more than one insulator could be utilized to accomplish similar purposes. Likewise, further insulators could be used in addition to the sealing insulator 120 as described.

In further adaptations, instead of separately provided insulating pieces and conductive pieces as described to effect the sealing and isolation features, an integral part could be provided that is conductive in designated areas and nonconductive in others. In such an embodiment, the insulator 112 and the conductor 108 could essentially be combined into one monolithic part and be provided for later assembly into the device 100.

While two storage cells 106 and 110 are shown in the illustrated embodiments, more than two cells could be provided, although it is understood that additional sealing conductors 108 and insulators 112 may be required to accommodate additional cells.

Figure 4:
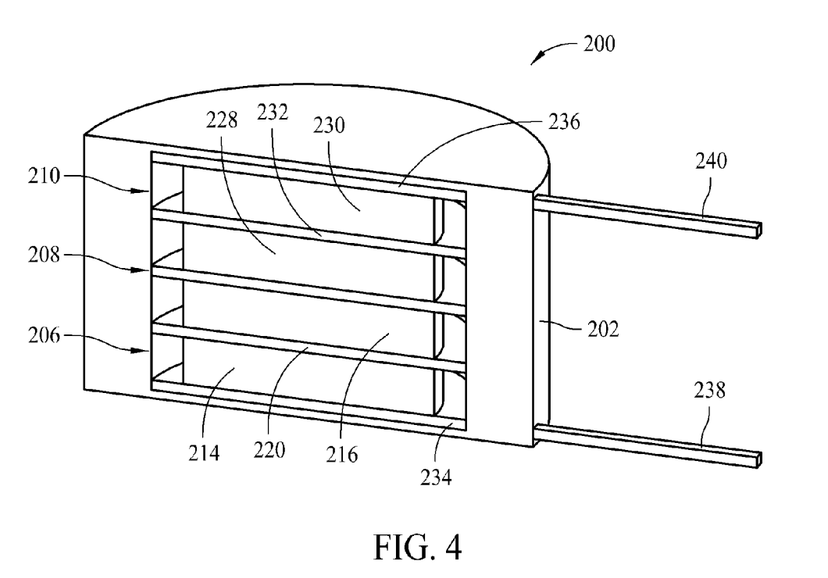
FIG. 4 is a sectional view of a second exemplary EDLC device.
Figure 5:
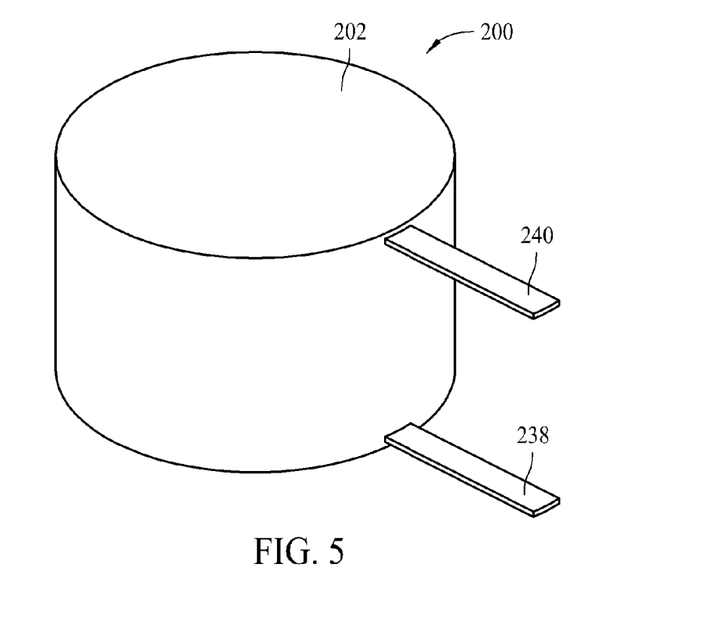
FIG. 5 is a perspective view of the EDLC device shown in FIG. 4.

FIGS. 4 and 5 illustrate a second exemplary embodiment of an EDLC device 200. The device 200 generally includes a nonconductive housing 202 generally shaped as a cylinder and having an interior cavity that contains a first storage cell 206, a sealing conductor 208, and a second storage cell 210. The storage cells 106 and 108 and the sealing conductor 108 are generally enclosed by the housing 202, which may be formed in more than one part or a as a single part in various embodiments. The housing 202 may be formed from electrically nonconductive materials known in the art, such as plastic for example, according to known techniques and processes, including but not limited to molding. While a rounded cylindrical shape of the housing is illustrate, other shapes are possible and may be utilized, including but not limited to square or rectangular shapes.

The first storage cell 206 is positioned adjacent to and in contact with the housing 202 on one side of the device 200. The first storage cell 206 includes electrodes 214 and 216 extending on opposing sides of a separator 220. In use, one of the electrodes 214 and 216 serves as an anode and the other of the electrodes 214 and 216 serves as a cathode, depending on the polarity of the device 200 when connected to electrical circuitry. The construction and operation of the cell 206 in the EDLC device 100 is well understood and will not be detailed further herein.

The sealing conductor 208 in the exemplary embodiment shown is generally flat and planar and has a disc-shape. Alternatively stated, the sealing conductor 208 is formed as a generally circular, flat plate in the exemplary embodiment shown, although other shapes are possible in other embodiments. The shape of the sealing conductor 208 is therefore greatly simplified compared to the sealing conductor 108 (FIGS. 2 and 3) in the device 100. The sealing conductor 208 may be formed from a suitable conductive material, such as those described above for the sealing conductor 108 in the device 100, according to known techniques.

Figure 6:
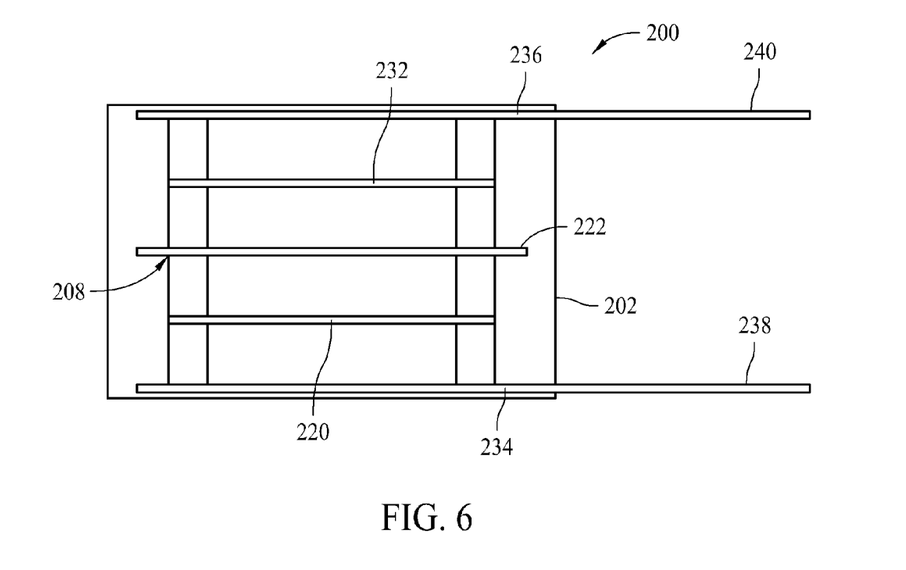
FIG. 6 is another sectional view of the EDLC device shown in FIGS. 3 and 4.

The sealing conductor 208 electrically connects the storage cells 206 and 210 in series with one another, while isolating ion movement between the cells 206 and 210 in operation. That is, the sealing conductor 208 separates the storage cells 206, 210 such that ions are prevented from moving from one cell 206 to the other 210 or vice-versa, but the sealing conductor 208 nonetheless provides a conductive path between the cells 206 and 210. As best shown in FIG. 6, a peripheral edge 222 of the sealing conductor 208 may extend into a side wall of the housing 202 to completely seal and partition the housing cavity between the storage cells 106, 110. That is, a radial dimension of the sealing conductor 208 in the example shown is greater than the inner radius of the housing 202 such that the housing sidewall 204 surrounds the peripheral edge 222 of the sealing conductor 208.

The second storage cell 210 extends adjacent to and in contact with the sealing conductor 208 opposite the first storage cell 206. The second storage cell 210 includes electrodes 228 and 230 extending on opposing sides of a separator 232. In use, one of the electrodes 228 and 230 serves as an anode and the other of the electrodes 228 and 230 serves as a cathode, depending on the polarity of the device 200 as connected to electrical circuitry. The construction and operation of the cell 210 in the EDLC device 200 is well understood and will not be detailed further herein. In an exemplary embodiment, the cell 210 is constructed substantially identically to the cell 206, although it is contemplated that the cells 206 and 210 could be constructed differently if desired. That is, the cells 206 and 210 may or may not include the same types of electrodes or separators in various embodiments of the device 200.

The separators 220, 232 in each of the cells 106, 110 may further extend into the side wall of the housing 202 as shown in FIG. 6. As such, the radius of the separators 220, 232 is lager than an inner radius of the housing side wall. The radius of the separators 220, 232 is larger, however, than the radius of the electrodes in the cells 206, 210.

Conductive terminal elements 234 and 236 are also provided that respective contact the first cell 206 and the second cell 210. The terminal elements 234 and 236 include generally circular contact areas adjacent to the respective electrodes 214 and 230 of the cells 206 and 210. The terminals 234 and 236 may be formed from as conductive metal plates, and in the example shown may include elongated connector sections 238, 240 that may be used to connect the device 200 to electrical circuitry in a known manner.

The insulating housing 202 electrically isolates the terminal elements 234 and 236 from one another, while the sealing conductor 208 connects the storage cells 206 and 208 between the terminal elements 234 and 236. In the example shown, only the connector sections 238, 240 of the elements 234 and 236 are exposed externally to the housing 202.

The insulating housing 202 eliminates a need for the sealing insulator 112 (FIGS. 2 and 3) in the device 200. The sealing conductor 208 is also greatly simplified in comparison to the sealing conductor 108 (FIGS. 2 and 3) in the device 100. The terminal elements 202, 204 are much more easily formed than the metal housing pieces 102, 104 in the device 100. The device 200 therefore provides a number of manufacturing advantages in relation to the device 200, including elimination of certain parts and simplification of other parts.

Operating voltages of up to about 5.5 V are possible using the devices 100 and 200, as compared to operating voltages of about 2.5 V to about 2.7 V for existing EDLC devices. The increased operating voltage in a single device package facilitates the advantages described above.

The benefits and advantages of the inventive concepts are now believed to have been amply illustrated in view of the exemplary embodiments disclosed.

An electric double layer capacitor (EDLC) device has been disclosed including: a housing; a first storage cell and a second storage cell each positioned in the housing, wherein the first and second storage cells are electrically connected in series with one another; and a sealing conductor establishing the series connection between the first and second storage cells.

Optionally, the sealing conductor may include a flat end wall and a cylindrical side wall. The end wall may extend between the first storage cell and the second storage cell, and the cylindrical side wall may surround a portion of the first storage cell. The cylindrical side wall may extend away from the second storage cell. The sealing conductor may also include a sealing rim extending from the side wall opposite the flat end wall. Alternatively, the sealing conductor may be a planar element, and a peripheral edge of the sealing conductor may extend into a side wall of the housing. The sealing conductor may be fabricated from at least one of a metal, a conductive polymer, and a conductive composite material.

A sealing insulator may also be optionally provided, with the sealing insulator coupled to a portion of the sealing conductor. The sealing conductor may include a cylindrical side wall, with the sealing insulator surrounding the side wall. The sealing conductor may also include a sealing rim, with the sealing insulator receiving a portion of the sealing rim. The sealing insulator may be configured to mechanically interconnect the first and second housings, and a portion of the sealing insulator may extend between and electrically isolate the first housing from the second housing. The sealing insulator may be fabricated from one of metal oxide and polymer.

Each of the first and second storage cells may include an anode, a cathode, and a separator therebetween. The housing may include a first housing piece and a second housing piece collectively defining a coin cell package configuration. The housing may be electrically conductive, or may be electrically insulative. First and second planar terminal elements may be situated adjacent the first storage cell and second storage cell. The first and second terminal elements may each include elongated connector sections extending external to the housing.

Another embodiment of an electric double layer capacitor (EDLC) device has been disclosed including: a housing defining an internal cavity; a first storage cell and a second storage cell contained in the internal cavity of housing; and a sealing conductor separating the first storage cell and the second storage cell within the internal cavity, the sealing conductor electrically connecting the first and second storage cells in series while isolating ion movement in each of the first and second storage cells.

Optionally, a sealing insulator may be coupled to a portion of the sealing conductor, wherein the sealing insulator electrically isolates the first and second housings from one another. The sealing conductor may include a flat end wall and a cylindrical side wall, wherein the end wall separates the first storage cell and the second storage cell. The cylindrical side wall surrounds a portion of the first storage cell. The sealing conductor may further include a sealing rim extending from the cylindrical side wall opposite the flat end wall, and the sealing rim may be engaged to the sealing insulator. The sealing insulator may be fabricated from one of metal oxide and polymer. Alternatively, the sealing conductor may be a planar element, and peripheral edge of the sealing conductor may extend into a side wall of the housing. The sealing conductor may be fabricated from one at least one of a metal, a conductive polymer, and a conductive composite material. The housing may be electrically insulative.

First and second planar terminal elements may be situated adjacent the first storage cell and second storage cell. The first and second terminal elements may each include elongated connector sections extending external to the housing. The housing may include a first conductive housing piece and a second conductive housing piece collectively defining a coin cell package configuration.

An embodiment of an electric double layer capacitor (EDLC) has been disclosed including: a first housing; a first storage cell adjacent the first housing; a sealing conductor comprising an end wall and a side wall, the end wall extending adjacent the first storage cell opposite the first housing, the side wall generally surrounding an outer perimeter of the first storage cell; a second storage cell proximate the sealing conductor opposite the first storage cell; a second housing adjacent the second storage cell; and a sealing insulator coupled to a portion of the sealing conductor and to the first and second housings; wherein the sealing insulator electrically isolates the first housing, the second housing and the sealing conductor from one another; and wherein the sealing conductor electrically connects the first and second storage cells in series while isolating ion movement in each of the first and second storage cells. Optionally, the first and second housing may collectively define a coin cell package configuration.

An embodiment of an electric double layer capacitor (EDLC) has been disclosed including: an electrically insulative housing defining an interior cavity; a first storage cell in the interior cavity; a sealing conductor extending adjacent the first storage cell in the cavity; a second storage cell in the interior cavity, the second storage cell being proximate the sealing conductor opposite the first storage cell; a first terminal adjacent the first storage cell opposite the sealing conductor; and a second terminal adjacent the second storage cell opposite the sealing conductor; wherein the sealing conductor electrically connects the first and second storage cells in series while isolating ion movement in each of the first and second storage cells; and wherein the housing electrically isolates the first and second terminal. Optionally, each of the first and second terminals comprise an elongated connector section extending external to the housing.

A method of manufacturing an electric double layer capacitor (EDLC) device has been disclosed, including: separating a first storage cell and a second storage cell with a sealing conductor; and enclosing the first and second storage cells in a single package, whereby the sealing conductor electrically connects the first and second storage cells in series while isolating ion movement in each of the first and second storage cells. Optionally, the package comprises a first conductive housing and a second conductive housing, and the method further includes electrically isolating the first housing, the second housing and the sealing conductor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric double layer capacitor (EDLC) device comprising: a housing; a first storage cell and a second storage cell each positioned in the housing, wherein the first and second storage cells are electrically connected in series with one another, wherein each of the first and second storage cells comprise a generally planar anode, a generally planar cathode extending parallel to but spaced from the planar anode, and a separator therebetween; and a sealing conductor establishing the series connection between the first and second storage cells, the sealing conductor comprising a body having a flat and planar outer extremity extending parallel to but spaced from the generally planar anode and the generally planar cathode of each of the first and second storage cells, the sealing conductor being mechanically retained in position between the first and second storage cells via the flat and planar outer extremity; and the flat and planar outer extremity being electrically insulated from the housing; wherein the body of the sealing conductor further comprises a flat end wall and a cylindrical side wall extending generally perpendicular to the flat end wall; wherein the flat end wall extends between the first storage cell and the second storage cell; and wherein the cylindrical side wall includes a first end and a second end opposing the first end, the flat end wall extending from the first end, and wherein the flat and planar outer extremity of the sealing conductor extends from the second end of the cylindrical side wall.

2. The EDLC of claim 1, wherein the generally planar anode and the generally planar cathode in the first storage cell each have a first height dimension measured generally perpendicular to the plane of the respective anode and cathode, the cylinder side wall of the sealing conductor surrounding a portion of the first storage cell and the cylindrical side wall having a second height dimension that is greater than the first height dimension.

3. The EDLC device of claim 1, wherein the cylindrical side wall extends away from the second storage cell.

4. The EDLC device of claim 1, wherein the sealing conductor is fabricated from at least one of a metal, a conductive polymer, and a conductive composite material.

5. The EDLC device of claim 1, further comprising a sealing insulator, the sealing insulator coupled to the flat and planar outer extremity.

6. The EDLC device of claim 5, wherein the cylindrical side wall of the sealing conductor body encloses one of the first and second storage cells, the sealing insulator surrounding the cylindrical side wall.

7. The EDLC device of claim 6, wherein the sealing insulator is configured to receive the flat and planar outer extremity.

8. The EDLC device of claim 5, wherein the housing comprises a first housing and a second housing, and wherein the sealing insulator is configured to mechanically interconnect the first and second housings.

9. The EDLC device of claim 5, wherein the housing comprises a first housing and a second housing, and wherein a portion of the sealing insulator extends between and electrically isolates the first housing from the second housing.

10. The EDLC device of claim 5, wherein the sealing insulator is fabricated from one of metal oxide and polymer.

11. The EDLC device of claim 5, wherein the sealing insulator is formed with a generally vertical slot for receiving a portion of one of the first and second housings, and wherein the sealing insulator is further formed with a generally horizontal slot receiving the flat and planar outer extremity of the sealing conductor.

12. The EDLC device of claim 1, wherein the housing comprises a first housing piece and a second housing piece collectively defining a coin cell package configuration.

13. The EDLC device of claim 1, wherein the housing is electrically insulative.

14. The EDLC device of claim 1, further comprising first and second planar terminal elements situated adjacent the first storage cell and second storage cell.

15. An electric double layer capacitor (EDLC) device comprising: a first housing and a second housing defining an internal cavity; a first storage cell and a second storage cell contained in the internal cavity of housing, wherein each of the first and second storage cells comprise an anode, a cathode, and a generally planar separator extending between the anode and the cathode; a sealing conductor separating the first storage cell and the second storage cell within the internal cavity, the sealing conductor being electrically isolated from the housing while electrically connecting the first and second storage cells in series and also while isolating ion movement in each of the first and second storage cells, the sealing conductor having a flat and planar outer extremity extending generally parallel to the plane of the separator of each of the first and second storage cells, the sealing conductor being mechanically retained in position between the first and second storage cells via the flat and planar outer extremity and the sealing conductor; a sealing insulator receiving the flat and planar outer extremity of the sealing conductor, the sealing insulator electrically isolating the first and second housings from one another; the sealing conductor further having a flat end wall, a cylindrical side wall extending perpendicular to the flat end wall, and the flat and planar outer extremity extending perpendicular to the cylindrical side wall; wherein the flat and planar outer extremity is spaced from but parallel to the flat end wall; and wherein the sealing insulator includes a slot receiving the flat and planar outer extremity.

16. The EDLC device of claim 15, wherein the cylindrical side wall surrounds the separator and a portion of both the anode and the cathode in the first storage cell.

17. The EDLC device of claim 15, wherein the sealing insulator is fabricated from one of metal oxide and polymer.

18. The EDLC device of claim 15, wherein the sealing conductor is fabricated from one at least one of a metal, a conductive polymer, and a conductive composite material.

19. The EDLC device of claim 15, wherein the housing is electrically insulative.

20. The EDLC device of claim 15, further comprising first and second planar terminal elements situated adjacent the first storage cell and second storage cell.

21. The EDLC device of claim 15, wherein the housing comprises a first conductive housing piece and a second conductive housing piece collectively defining a coin cell package configuration.

22. An electric double layer capacitor (EDLC) comprising: a first housing; a first storage cell adjacent the first housing, the first storage cell comprising an anode, a cathode, and a separator extending between the anode and the cathode; a sealing conductor comprising a planar end wall and a cylindrical side wall extending perpendicular to the planar end wall, the end wall extending adjacent the first storage cell opposite the first housing, the side wall generally surrounding an outer perimeter of the separator and a portion of each of the anode and the cathode in the first storage cell; a second storage cell proximate the sealing conductor opposite the first storage cell; a second housing adjacent the second storage cell; and a single sealing insulator configured to receive a portion of the sealing conductor at a first location, the single sealing insulator configured to receive a portion of the second housing at a second location; wherein the single sealing insulator electrically isolates the first housing, the second housing and the sealing conductor from one another; wherein the sealing conductor electrically connects the first and second storage cells in series while isolating ion movement in each of the first and second storage cells; wherein the cylindrical side wall includes a first end and a second end opposing the first end, the planar end wall extending from the first end, and a flat and planar outer extremity extending from the second end of the cylindrical side wall; wherein the planar end wall extends between the first storage cell and the second storage cell; and the sealing conductor being mechanically retained to the single sealing insulator via the flat and planar outer extremity.

23. The EDLC device of claim 22, wherein and the first and second housing collectively define a coin cell package configuration.

24. An electric double layer capacitor (EDLC) comprising: a housing defining an interior cavity; a first storage cell in the interior cavity the first storage cell comprising an anode extending in a first plane, a cathode extending in a second plane, and a separator extending in a third plane between the anode and the cathode; a sealing conductor extending adjacent the first storage cell in the cavity, the sealing conductor having a flat and planar outer extremity extending parallel to but spaced from the first, second and third planes, a cylindrical side wall extending perpendicular to the flat and planar outer extremity, and a planar extending parallel to but spaced from the flat and planar outer extremity; a second storage cell in the interior cavity, the second storage cell being proximate the sealing conductor opposite the first storage cell; a first terminal adjacent the first storage cell opposite the sealing conductor; and a second terminal adjacent the second storage cell opposite the sealing conductor; wherein the sealing conductor electrically connects the first and second storage cells in series while isolating ion movement in each of the first and second storage cells; wherein the flat and planar outer extremity of the sealing conductor is received by one of a sealing insulator and a side wall of the housing to fix the location of the sealing conductor in the interior cavity, and wherein the sealing conductor is electrically isolated from the housing.

25. A method of manufacturing an electric double layer capacitor (EDLC) device, comprising: assembling a first storage cell and a second storage cell on opposing sides of a sealing conductor, the sealing conductor having a flat and planar outer extremity, a side wall extending perpendicular to the flat and planar outer extremity, and a planar end wall extending parallel to but spaced from the flat and planar outer extremity; and enclosing the first and second storage cells in a single package and fixing the sealing conductor in position via the flat and planar outer extremity, whereby the sealing conductor electrically connects the first and second storage cells in series while isolating ion movement in each of the first and second storage cells, wherein the package comprises a first a conductive housing and a second conductive housing, the method further comprising electrically isolating the first housing, the second housing and the sealing conductor.

* * * * *

UNITED STATES PATENT AND TRADEMARK OFFICE
CERTIFICATE OF CORRECTION

PATENT NO. : 8,508,916 B2  
APPLICATION NO. : 12/903574  
DATED : August 13, 2013  
INVENTOR(S) : Kyle Yun-Su Kim and Hundi Panduranga Kamath Page 1 of 1

It is certified that error appears in the above-identified patent and that said Letters Patent is hereby corrected as shown below:

In the Claims

In Column 11, Line 44, Claim 15, delete "extremity and" and insert -- extremity of -- therefor.

Signed and Sealed this
Twenty-first Day of October, 2014

Michelle K. Lee
*Deputy Director of the United States Patent and Trademark Office*